(12) United States Patent
Füllenbach

(10) Patent No.: US 6,227,228 B1
(45) Date of Patent: May 8, 2001

(54) PURGE PROCESS FOR SEQUENTIAL PLURAL COMPONENT MIXING SYSTEM

(75) Inventor: Arnd Füllenbach, Willich (DE)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 08/902,408

(22) Filed: Jul. 29, 1997

Related U.S. Application Data

(60) Provisional application No. 60/023,065, filed on Aug. 2, 1996.

(51) Int. Cl.⁷ ............................... B08B 9/02; F16K 51/00
(52) U.S. Cl. ..................... 137/240; 134/95.1; 134/98.1; 134/102.1; 134/166 C; 134/171; 222/148; 239/112
(58) Field of Search ........................... 137/240; 222/148; 239/112, 106; 134/94.1, 95.1, 98.1, 99.1, 100.1, 102.1, 102.2, 166 C, 168 C, 169 C, 171

(56) References Cited

U.S. PATENT DOCUMENTS

| | | | |
|---|---|---|---|
| 3,179,341 * | 4/1965 | Plos et al. ......................... | 239/112 |
| 3,180,350 * | 4/1965 | Rill, Jr. et al. ..................... | 137/240 |
| 3,219,273 * | 11/1965 | Killen ............................... | 137/240 |
| 3,348,774 * | 10/1967 | Wiggins ........................... | 239/112 |
| 3,366,337 | 1/1968 | Brooks et al. ..................... | 239/414 |
| 3,373,762 * | 3/1968 | Korchak ........................... | 137/240 |
| 3,403,695 * | 10/1968 | Hopkins ........................... | 239/112 |
| 3,462,081 * | 8/1969 | Gelin ............................... | 239/112 |
| 3,572,366 * | 3/1971 | Wiggins ........................... | 137/240 |
| 3,674,205 * | 7/1972 | Kock ............................... | 137/240 |
| 3,690,557 | 9/1972 | Higgins ........................... | 239/112 |
| 3,939,855 * | 2/1976 | Wiggins ........................... | 137/240 |
| 4,215,721 | 8/1980 | Hetherington et al. ............ | 137/606 |
| 4,285,446 * | 8/1981 | Rapp et al. ....................... | 137/240 |
| 4,485,840 * | 12/1984 | Erwin .............................. | 137/240 |
| 4,529,127 * | 7/1985 | Huszagh .......................... | 239/112 |
| 4,549,676 | 10/1985 | Gerich ............................. | 222/145 |
| 4,657,047 * | 4/1987 | Kolibas ............................ | 137/240 |
| 4,745,011 | 5/1988 | Fukuta et al. .................... | 427/426 |
| 5,086,949 | 2/1992 | Vulpitta et al. .................... | 222/1 |
| 5,170,939 | 12/1992 | Martin ............................. | 239/112 |
| 5,294,052 | 3/1994 | Kukesh ........................... | 239/112 |
| 5,400,971 | 3/1995 | Maugans et al. ................. | 239/416 |
| 5,803,109 * | 9/1998 | Rosen .............................. | 137/240 |

* cited by examiner

*Primary Examiner*—George L. Walton
(74) *Attorney, Agent, or Firm*—Douglas B. Farrow

(57) ABSTRACT

Modern hydro-softfeel lacquers have special characteristics which make the use of plural component mixing equipment difficult. To solve the problem with the hydro-softfeel lacquer, an additional valve is installed in the mixing block of the resin side, that is the single purge valve previously used on the resin side is replaced by an adapter block which has two valves so that the two separate purge materials can be flushed into the outer tube of the integrator and one purge material used on the inner tube.

1 Claim, 1 Drawing Sheet

PURGE PROCESS FOR SEQUENTIAL PLURAL COMPONENT MIXING SYSTEM

RELATED APPLICATIONS

Figure 1:
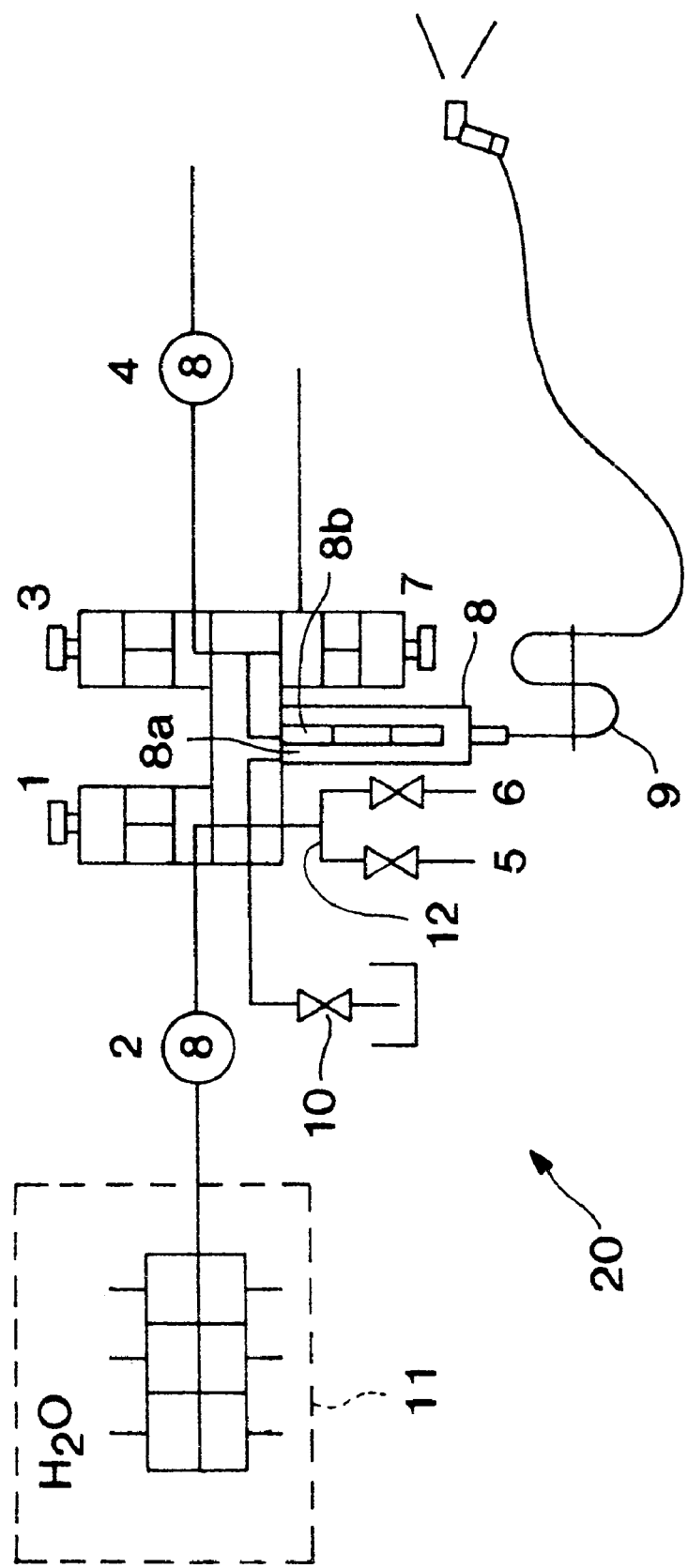

This application is a continuation-in-part of U.S. application Ser. No. 60/023,065, filed Aug. 2, 1996.

BACKGROUND OF THE INVENTION

Modern hydro-softfeel lacquers have special characteristics which make the use of plural component mixing equipment difficult. In particular, the solvent which is required to be used on the catalyst side of the mixing equipment is incompatible with the resin.

The general mixing process for the instant invention is set forth in European Patent EP0116879 in that portions of resin and catalyst are sequentially dosed into an integrator tube where some homogenization takes place and the premixed material is then finally homogenized in a static mixer. This procedure is continuously repeated thus providing a continuous mixed material from the sequential dosing system. Currently, such systems are sold by the assignee of the instant invention under the trademark PRECISIONMIX.

SUMMARY OF THE INVENTION

To solve the problem with the hydro-softfeel lacquer, an additional valve is installed in the mixing block of the resin side, that is the single purge valve previously used on the resin side is replaced by an adapter block which has two valves so that the two separate purge materials can be flushed into the outer tube of the integrator and one purge material used on the inner tube.

During production, only the mixed material is purged and the catalyst will remain in the inner tube. This is performed by using two resin purge valves which inject water and air at intervals into the integrator tube mix chamber. This mixture is then flushed via the hose and gun.

When the purge process is terminated the mix program is restarted. This process is used for color change, however at the end of production or substantial periods of interruption of production, the catalyst too then must be flushed. To do so, the process set forth above is initially applied and when the integrator tube is completely free of mixed material and resin, the purge valve on the catalyst side opens and the catalyst is flushed with solvent.

Because the resin and solvent are completely incompatible, it is necessary to make sure that the solvent has been flushed completely out of the integrator tube and the mixed material line before starting the mix process. Therefore the catalyst valve is opened for a certain time sufficient to replace the solvent in the integrator with catalyst before the initial purge process described above for color change is again initially applied to flush the solvent out of the mixed material line.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 shows a schematic view of the plural component mixing system used with the method of the instant invention.

DESCRIPTION OF THE PREFERRED EMBODIMENT

The instant invention is generally designated 20 and is shown schematically in FIG. 1. To solve the problem with the hydro-softfeel lacquer, an additional valve is installed in the mixing block of the resin side, that is the single purge valve previously used on the resin side is replaced by an adapter block 12 which has two valves 5 and 6 so that the two separate purge materials can be flushed into the outer tube 8a of the integrator 8 and one purge material used on the inner tube 8b.

During production, only the mixed material is purged and the catalyst will remain in the inner tube 8b. This is performed by using two resin purge valves 5 and 6 which inject water and air a t intervals into the integrator tube 8 mix chamber. This mixture is then flushed via the hose and gun.

When the purge process is terminated the mix program is restarted. This process is used for color change, however at the end of production or substantial periods of interruption of production, the catalyst too then must be flushed. To do so, the process set forth above is initially applied and when the integrator 8 tube is completely free of mixed material and resin, the purge valve 7 on the catalyst side opens and the catalyst is flushed with solvent.

Because the resin and solvent are completely incompatible, it is necessary to make sure that the solvent has been flushed completely out of the integrator tube 8 and the mixed material line before starting the mix process. Therefore the catalyst valve 3 is opened for a certain time sufficient to replace the solvent in the integrator 8 with catalyst before the initial purge process described above for color change is again initially applied to flush the solvent out of the mixed material line.

It is contemplated that various changes and modifications may be made to the method without departing from the spirit and scope of the invention as defined by the following claims.

What is claimed is:

1. A method for flushing hydro-softfeel lacquer from a plural component mixing system having resin and catalyst dispense valves, air and water purge valves attached to the resin side of the mixer, a solvent purge valve attached to the catalyst side of the mixer and an integrator having concentric chambers with said resin feeding the outer chamber and said catalyst feeding the inner chamber, said method comprising the steps of:

alternately injecting water and air at intervals into the integrator tube mix chamber through said air and water purge valves to purge said mixed material until said integrator tube is completely free of mixed material and resin; and opening said solvent purge valve on said catalyst side so that said catalyst is flushed with solvent.

* * * * *